United States Patent
Kim et al.

(10) Patent No.: US 9,064,214 B2
(45) Date of Patent: Jun. 23, 2015

(54) CONTEXT AWARE APPARATUS AND METHOD

(75) Inventors: Su-Myeon Kim, Hwaseong-si (KR);
Weon-Il Jin, Suwon-si (KR);
Won-Keun Kong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 13/350,048

(22) Filed: Jan. 13, 2012

(65) Prior Publication Data
US 2013/0097105 A1     Apr. 18, 2013

(30) Foreign Application Priority Data
Oct. 12, 2011   (KR) .................. 10-2011-0104240

(51) Int. Cl.
*G06N 5/02*      (2006.01)
*G06N 5/04*      (2006.01)

(52) U.S. Cl.
CPC ........................................ *G06N 5/04* (2013.01)

(58) Field of Classification Search
CPC .................................. G06N 5/02; G06N 5/04
USPC ..................................................... 706/45, 12
See application file for complete search history.

(56) References Cited

U.S. PATENT DOCUMENTS

2011/0246407 A1    10/2011   Lee et al.

FOREIGN PATENT DOCUMENTS

| KR | 10-2010-0047646 A | 5/2010 | |
| KR | 10-2010-0068981 | 6/2010 | |
| KR | 10-2011-0012306 A | 2/2011 | |
| KR | 10-2011-0048651 | 5/2011 | |
| WO | WO 2011/055925 A2 | 5/2011 | |
| WO | WO 2013/042116 A1 * | 3/2013 | ............ G06F 17/30 |

OTHER PUBLICATIONS

Norbert Baumgartner, Wolfgang Gottesheim, Stefan Mitsch, Werner Retschitzegger, Wieland Schwinger, BeAware!—Situation awareness, the ontology-driven way, Data & Knowledge Engineering, vol. 69, Issue 11, Nov. 2010, pp. 1181-1193, ISSN 0169-023X, http://dx.doi.org/10.1016/j.datak.2010.07.008. (http://www.sciencedirect.com/science/article/pii/.*

* cited by examiner

*Primary Examiner* — Jeffrey A Gaffin
*Assistant Examiner* — Ola Olude Afolabi
(74) *Attorney, Agent, or Firm* — NSIP Law

(57) ABSTRACT

A context aware apparatus is provided. The context aware apparatus includes an extracting unit configured to extract a terminological-box (T-box) from a semantic model, a first generating unit configured to generate a reasoning rule based on the extracted T-box, a second generating unit configured to generate a first assertion-box (A-box) based on sensing information, and a reasoning unit configured to infer a user context based on the reasoning rule and the first A-box.

13 Claims, 5 Drawing Sheets

CONTEXT AWARE APPARATUS AND METHOD

CROSS-REFERENCE TO RELATED APPLICATION(S)

This application claims the benefit under 35 U.S.C. §119(a) of Korean Patent Application No. 10-2011-0104240, filed on Oct. 12, 2011, in the Korean Intellectual Property Office, the entire disclosure of which is incorporated herein by reference for all purposes.

BACKGROUND

1. Field

The following description relates to a context aware apparatus and method.

2. Description of the Related Art

People often use intuition to recognize an object and/or understand a situation. Since a conventional reasoning device does not use intuition, the conventional reasoning device does not perform reasoning like a person. To overcome such a lack of reasoning, various research on methods reflecting human intuition have been conducted on user context reasoning.

Recently, context awareness-based services have been offered based on a user's current situation. Reasoning methods have been increasingly researched that infer the user's current situation. A context aware service provides the most appropriate and useful information, services, contents, or any combination thereof to a user based on a recognized current situation of the user. For example, in response to a user of a context aware service getting in a car to go away for vacation, the context aware service may play music in the car based on a recognized user's schedule, current location, behaviors, and preference.

For a more accurate context-aware service, a more accurate reasoning of a user's current situation may be desired. However, performing knowledge-based (KB) reasoning on a user's context may be difficult and complicated. Thus, a technology to fast and easily infer and recognize a user context using sensing information may be needed.

SUMMARY

As a general aspect, a context aware apparatus is provided. The context aware apparatus includes an extracting unit configured to extract a terminological-box (T-box) from a semantic model, a first generating unit configured to generate a reasoning rule based on the extracted T-box, a second generating unit configured to generate a first assertion-box (A-box) based on sensing information, and a reasoning unit configured to infer a user context based on the reasoning rule and the first A-box.

The reasoning rule may relate to a relationship between A-boxes.

The extracting unit may extract a second A-box from the semantic model.

The context aware apparatus may include a merging unit configured to merge the first A-box and the second A-box into one A-box, and output the merged A-box to the reasoning unit.

The T-box may correspond to information that defines a relationship between classes and the A-box may correspond to information that defines a relationship between an instance and a class.

In response to the sensing information being changed, the second generating unit may generate a different first A-box.

The reasoning unit may not use the T-box to infer the user context.

In another aspect, a context aware method is provided. The context aware method includes extracting a terminological-box (T-box) from a semantic model, generating a reasoning rule based on the T-box, generating a first assertion box (A-box) based on sensing information, and inferring a user context based on the reasoning rule and the first A-box.

The reasoning rule may relate to a relationship between A-boxes.

The extracting of the T-box may include extracting a second A-box from the semantic model.

The context aware method may include merging the first A-box and the second A-box into one A-box. The inferring of the user context may include inferring the user context based on the reasoning rule and the merged A-box.

The T-box may correspond to information that defines a relationship between classes and the first A-box may correspond to information that defines a relationship between an instance and a class.

In another aspect, a device is provided. The device includes a context aware apparatus including a first generating unit configured to generate a reasoning rule based on a T-box extracted from a semantic model, the T-box may correspond to information that defines a relationship between classes, a second generating unit configured to generate a first assertion-box (A-box) based on sensing information, and a reasoning unit configured to infer a user context based on the reasoning rule and the first A-box.

Other features and aspects may be apparent from the following detailed description, the drawings, and the claims.

Figure 1:
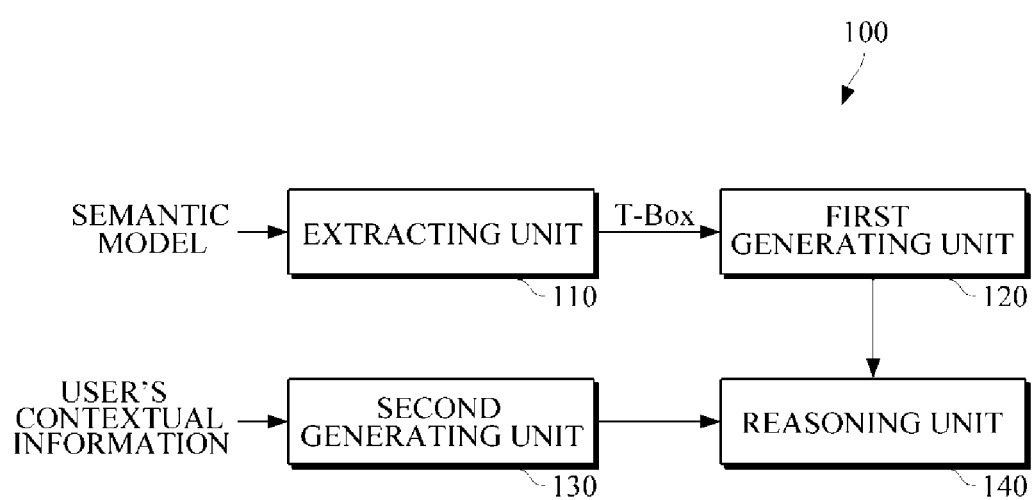
FIG. 1 is a diagram illustrating an example of a context aware apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a context aware apparatus.

Referring to FIG. 1, a context aware apparatus 100 may include an extracting unit 110, a first generating unit 120, a second generating unit 130, and a reasoning unit 140.

The context aware apparatus 100 may be implemented to be included in a terminal. The terminal may refer to any type of device that can have a context aware technique applied thereto. Such a device includes a mobile phone, a smartphone, a tablet PC, a notebook computer, a TV, a digital broadcast terminal, a personal digital assistant (PDA), a portable multimedia player, a navigation, and the like.

A semantic model may represent various contexts, fact information, a contextual relationship between concepts, and a contextual relationship between a concept and fact information. The semantic model may include a terminological box and an assertion box. The terminological box may, hereinafter, be referred to as a 'T-box'. A T-box may correspond to information that relates to a relationship between classes. The assertion box may, hereinafter, be referred to as an 'A-box'.

A class may relate to a context. An A-box may correspond to information that relates to a relationship between an instance and a class. An instance may be fact information related to a particular class.

Figure 2:
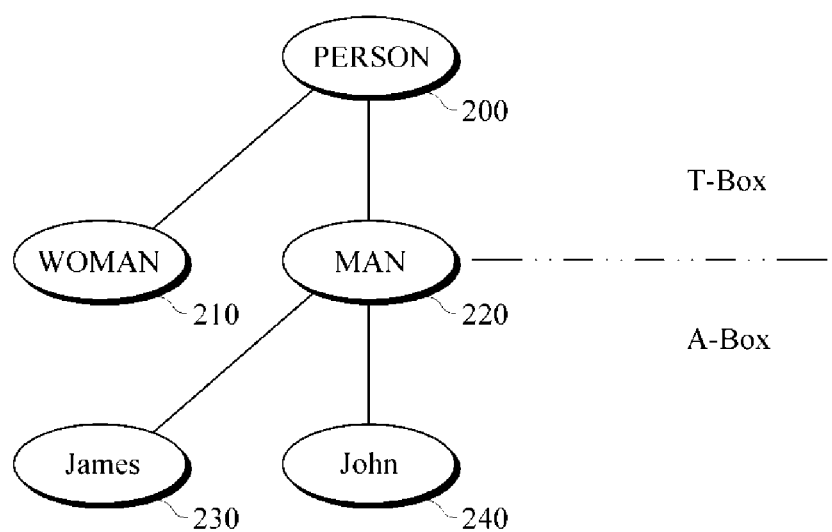
FIG. 2 is a diagram illustrating an example of a terminological box (T-box) and an assertion box (A-box).

FIG. 2 illustrates an example of a T-box and an A-box.

Referring to FIG. 2, a semantic model may include a T-box and an A-box. Hereinafter, the example may assume that the semantic model relates to classification of people. In this example, concepts used to classify people may include a 'person' 200, a 'woman' 210, a 'man' 220, and the like, and fact information may include 'James' 230, 'John' 240, and the like. A T-box may correspond to information that relates to a relationship between classes. For example, "a woman 210 is a person 200" or "a man 220 is a person 200." In this example, the 'person' 200, the 'woman' 210, and 'man' 220 are classes. For example, an A-box may be information that relates to a relationship between an instance and a class. The A-box may be "James 230 is a man 220" and "John 240 is a man 220." In the example, 'James' 230 and 'John' 240 are instances of fact information.

Referring back to FIG. 1, the extracting unit 110 may extract a T-box that relates to a relationship between classes from the semantic model.

The first generating unit 120 may generate a reasoning rule based on the T-box. The extracting unit 110 may extract the T-box. The reasoning rule may specify a relationship between A-boxes. For example, the reasoning rule may be in a form that a consequence A-box is satisfied in response to a condition A-box being satisfied. As an example, the reasoning rule may be in the form of "if a given instance is related to a first class ('condition A-box'), the instance is related to a second class ('consequence A-box')." The reasoning rule will be further described with reference to FIG. 3.

The second generating unit 130 may generate a first A-box based on sensing information. The sensing information may relate to information sensed to recognize a user state. The sensing information may include a location of the user, a temperature around the user, a person who the user currently meets, current time, and a user's emotional state. The sensing information may be contextual information included in text messages (SMS, MMS), emails, schedules, notes, information, or any combination thereof. A thermal sensor, a gyro sensor, a location information collector of a terminal, a communication unit, or any combination thereof may collect the information.

The second generating unit 130 may relate to a relationship between the sensing information ('instance') and a class to generate an A-box. Each time the sensing information changes the A-box may be newly generated. There may be one or more T-boxes, reasoning rules, and A-boxes.

Based on the reasoning rule generated by the first generating unit 120 and the first A-box generated by the second generating unit 130, the reasoning unit 140 may infer a context of the user. That is, the reasoning unit 140 may infer a context of the user using the reasoning rule and the first A-box only. The reasoning unit does not use the T-box. For example, in response to a T-box being "Americans live in America," a reasoning rule being "if A (instance) is an American (class) ('condition A-box'), A (instance) lives in America (class) ('consequence A-box')," and the first A-box being "John (instance) is an American," the reasoning unit 140 may infer a user context such as "John lives in America." As another example, in response to a T-box being "a person is more likely to eat popcorn in the theater," a reasoning rule being "if A (instance) is in the theater (class), A is more likely to eat popcorn," and a first A-box being "John is in the theater," the reasoning unit 140 may infer a user context such as "John (instance) is more likely to eat popcorn."

The context-aware apparatus 100 may infer a user context via the reasoning unit 140 using a reasoning rule and an A-box only. Thus, the context reasoning performance may be improved. As another aspect, since the reasoning is performed using the A-box and the reasoning rule based on a T-box, even when the A-box changes due to, for example, new sensing information, only the A-box needs to be updated. No re-reasoning with respect to the T-box needs to be performed.

In addition, the context aware apparatus 100 may infer a user context through the reasoning unit 140 only using a reasoning rule and an A-box. Faster reasoning of the user context with a lower usage of memory may be implemented in comparison to the reasoning based on both a T-box and an A-box.

Figure 3:
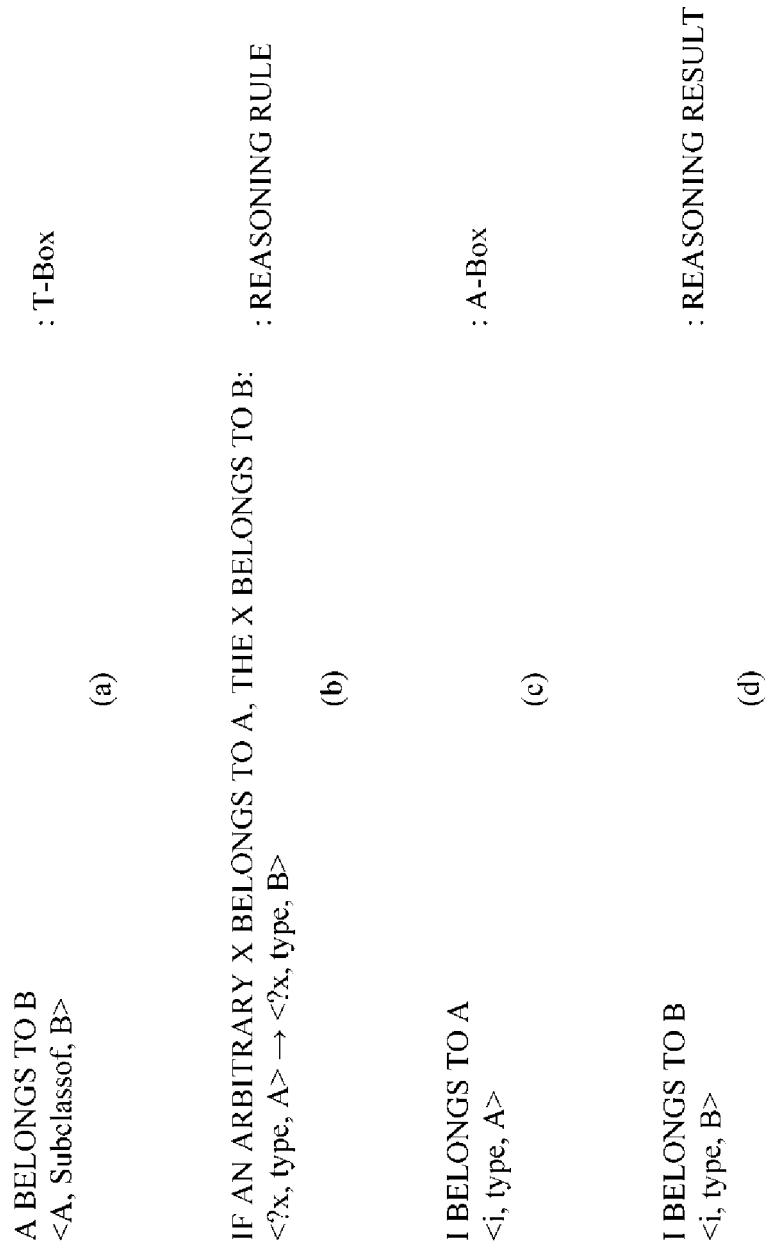
FIG. 3 is a diagram illustrating an example of a process of a context aware apparatus inferring a user context.

FIG. 3 illustrates a process of a context aware apparatus inferring a user context.

Referring to (a) of FIG. 3, the context aware apparatus may extract a T-box from a semantic model. The T-box may be "A belongs to B." The T-box in the form of a rule may be stated as <A, Subclassof, B>, where 'A' and 'B' may correspond to concepts or classes, and 'subclassof' may be a term corresponding to a former class as a subclass of a latter class.

Referring to (b) of FIG. 3, the context aware apparatus may generate a reasoning rule based on the extracted T-box. The reasoning rule may relate to a relationship between A-boxes. For example, the reasoning rule may define that in response to a condition A-box being satisfied, a consequence A-box may be satisfied. As an example, based on a T-box, "A belongs to B," the context aware apparatus may generate a rule that in response to an arbitrary x (instance) belonging to A (class) (condition A-box), the x (instance) belongs to B (class) (consequence A-box). The above reasoning rule may be stated as <?x, type, A>→<?x, type, B>, where ?x represents an arbitrary instance and type indicates an instance belonging to a specific class.

The context aware apparatus may transform a T-box into a relationship between A-boxes to generate a reasoning rule. In another example, the context aware apparatus may generate a reasoning rule based on a T-box using various other methods.

Referring to (c) of FIG. 3, the context aware apparatus may generate an A-box based on sensing information. For example, based on sensing information, the context aware apparatus may generate an A-box defining that i belongs to A. The A-box may correspond to <i, type, A>, where i, as an instance, relates to sensing information, A relates to a class and concept.

Referring to (d) of FIG. 3, the context aware apparatus may infer a user context based on a reasoning rule and an A-box. For example, the context aware apparatus may infer that i belongs to B based on a reasoning rule defining that in response to an arbitrary x (instance) belonging to A (class), the x (instance) belongs to B (class) and an A-box. The A-box defines that i belongs to A. The reasoning result may be expressed as <i, type, B>.

In the above examples, for clarity and conciseness, one T-box, one reasoning rule and one A-box are used. As another aspect, a different number of T-boxes, reasoning rules and A-boxes may be applied.

The context aware apparatus only uses a reasoning rule and an A-box for user context reasoning. Thus, the context aware apparatus may reduce overhead in comparison to the user context reasoning based on a T-box and an A-box. Also, the context aware apparatus may infer a user context faster and use less memory in comparison to the context reasoning based on a T-box and an A-box.

Figure 4:
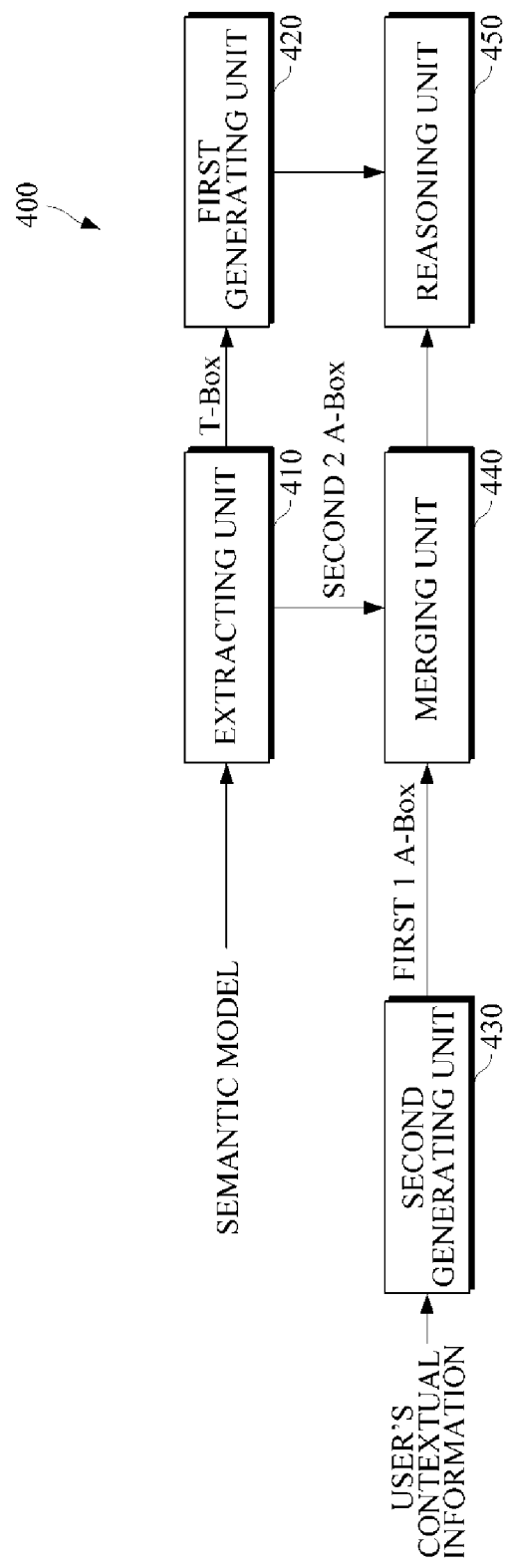
FIG. 4 is a diagram illustrating another example of a context aware apparatus.

FIG. 4 illustrates another example of a context aware apparatus.

Referring to FIG. 4, context aware apparatus 400 may include an extracting unit 410, a first generating unit 420, a second generating unit 430, a merging unit 440, and a reasoning unit 450.

The extracting unit 410 may extract a T-box and an A-box from a semantic model. The semantic model includes a T-box and an A-box. Hereinafter, an A-box included in the semantic model will be referred to as a 'second A-box.'

The first generating unit 420 may generate a reasoning rule based on the extracted T-box. The T-box may be extracted by the extracting unit 410. The reasoning rule may correspond to a relationship between A-boxes.

The second generating unit 430 may generate a first A-box based on sensing information. The first A-box may be a dynamic A-box newly generated each time the sensing information changes, whereas the second A-box may be a static A-box which rarely changes. The second A-box may be included in the semantic model. For example, the second A-box may contain fact information. For example, the fact information may be personal information of a user.

The merging unit 440 may merge the first A-box and the second A-box into one A-box. Thus, the merging unit 440 updates the A-box. The merging unit 440 may output the merged A-box to the reasoning unit 450.

Based on the reasoning rule and the merged A-box, the reasoning unit 450 may infer a user context.

The context aware apparatus may merge the first A-box generated based on the sensing information and the second A-box included in the semantic model into one A-box and the context aware apparatus may infer a user context based on the reasoning rule and the merged A-box to improve the context reasoning performance.

Moreover, the context aware apparatus may infer a user context based on only the reasoning rule and the A-box. Thus, the context aware apparatus may be capable of implementing faster user context reasoning and use less memory in comparison to the user context reasoning based on a T-box and an A-box.

Figure 5:
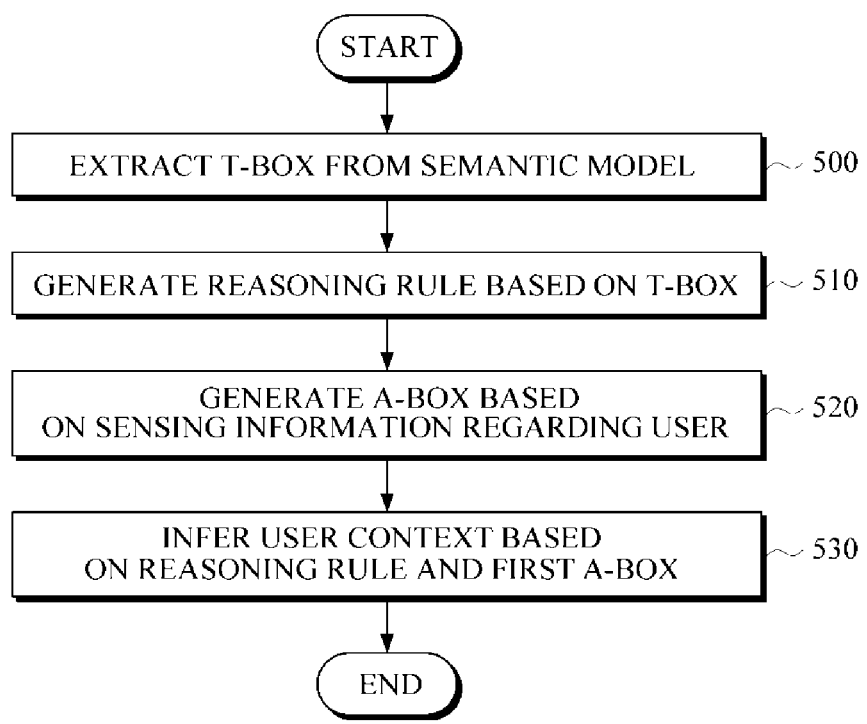
FIG. 5 is a flowchart illustrating an example of a context aware method.

FIG. 5 illustrates an example of a context aware method.

Referring to FIG. 5, a context aware apparatus may extract a T-box from a semantic model in operation 500. The semantic model includes T-boxes and A-boxes.

The context aware apparatus may generate a reasoning rule based on the T-box in operation 510. The reasoning rule may relate to a relationship between the A-boxes. For example, the reasoning rule may specify that in response to a condition A-box being satisfied, a consequence A-box is satisfied.

The context aware apparatus generates a first A-box based on sensing information regarding a user in operation 520. The first A-box may be newly generated each time the sensing information changes.

The context aware apparatus may infer a user context based on the reasoning rule and the first A-box in operation 530. In other words, the context aware apparatus may infer a user context using only the reasoning rule and the first A-box and without usage of a T-box.

In another example, the context aware apparatus may extract a second A-box from the semantic model. The context aware apparatus may merge the first A-box and the second A-box into one A-box. The context aware apparatus may infer the user context based on the reasoning rule and the merged A-box.

As described above, the context aware method may infer a user context using only a reasoning rule and an A-box to improve context aware performance.

In addition, the aforementioned context aware method that infers a user context based on only the reasoning rule and the A-box allows faster user context reasoning with less memory usage in comparison to the user context reasoning based on both a T-box and an A-box.

Examples of other devices including the context aware apparatus 100 include an automobile, a video game system, and the like.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums.

Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described units are implemented using hardware components.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A context aware apparatus comprising:
   an extracting processor configured to extract, from a semantic model, a terminological-box (T-box) comprising information that defines a relationship between classes;

a first generating processor configured to generate a reasoning rule based on the extracted T-box;
a second generating processor configured to generate a first assertion-box (A-box) based on sensing information, wherein the sensing information relates to information sensed to recognize a user state; and
a reasoning processor configured to infer a user context based on the reasoning rule and the first A-box.

2. The context aware apparatus of claim 1, wherein the reasoning rule relates to a relationship between A-boxes.

3. The context aware apparatus of claim 1, wherein the extracting processor extracts a second A-box from the semantic model.

4. The context aware apparatus of claim 3, further comprising:
a merging processor configured to merge the first A-box and the second A-box into one A-box, and output the merged A-box to the reasoning processor.

5. The context aware apparatus of claim 1, wherein the A-box corresponds to information that defines a relationship between an instance and a class.

6. A context aware method comprising:
extracting, from a semantic model, a terminological-box (T-box) comprising information that defines a relationship between classes;
generating a reasoning rule based on the T-box;
generating a first assertion box (A-box) based on sensing information, wherein the sensing information relates to information sensed to recognize a user state; and
inferring a user context based on the reasoning rule and the first A-box.

7. The context aware method of claim 6, wherein the reasoning rule relates to a relationship between A-boxes.

8. The context aware method of claim 6, wherein the extracting of the T-box comprises extracting a second A-box from the semantic model.

9. The context aware method of claim 8, further comprising:
merging the first A-box and the second A-box into one A-box,
wherein the inferring of the user context comprises inferring the user context based on the reasoning rule and the merged A-box.

10. The context aware method of claim 6, wherein the first A-box corresponds to information that defines a relationship between an instance and a class.

11. A device comprising:
a context aware apparatus comprising:
a first generating processor configured to generate a reasoning rule based on a T-box extracted from a semantic model, the T-box comprising information that defines a relationship between classes;
a second generating processor configured to generate a first assertion-box (A-box) based on sensing information, wherein the sensing information relates to information sensed to recognize a user state; and
a reasoning processor configured to infer a user context based on the reasoning rule and the first A-box.

12. The context aware apparatus of claim 1, wherein in response to the sensing information being changed, the second generating processor generates a different first A-box.

13. The context aware apparatus of claim 1, wherein the reasoning processor does not use the T-box to infer the user context.

* * * * *